(12) United States Patent
Berry

(10) Patent No.: US 8,630,992 B1
(45) Date of Patent: Jan. 14, 2014

(54) URL RANK VARIABILITY DETERMINATION

(75) Inventor: Vishal R. Berry, New York, NY (US)

(73) Assignee: Conductor, Inc., New York, NY (US)

( * ) Notice: Subject to any disclaimer, the term of this patent is extended or adjusted under 35 U.S.C. 154(b) by 72 days.

(21) Appl. No.: 12/961,952

(22) Filed: Dec. 7, 2010

(51) Int. Cl.
*G06F 17/30* (2006.01)

(52) U.S. Cl.
USPC .......................................... 707/706; 707/722

(58) Field of Classification Search
USPC ............ 707/1, 5, 706, 999, 722, 728; 706/46, 706/52; 705/1, 10, 14
See application file for complete search history.

(56) References Cited

U.S. PATENT DOCUMENTS

| | | | |
|---|---|---|---|
| 6,321,228 B1 * | 11/2001 | Crandall et al. ....................... 1/1 |
| 6,990,494 B2 * | 1/2006 | Bates et al. .................... 715/234 |
| 7,080,073 B1 * | 7/2006 | Jiang et al. .............................. 1/1 |
| 7,251,654 B2 * | 7/2007 | Eiron et al. ................... 707/723 |
| 7,363,308 B2 * | 4/2008 | Dillon et al. .................. 707/706 |
| 7,660,815 B1 * | 2/2010 | Scofield et al. ........ 707/999.102 |
| 7,747,613 B2 * | 6/2010 | Freeman et al. .............. 707/722 |
| 7,827,172 B2 * | 11/2010 | Zaragoza ...................... 707/723 |
| 8,069,179 B2 * | 11/2011 | Chickering et al. .......... 707/758 |
| 8,117,224 B2 * | 2/2012 | Galfond ........................ 707/759 |
| 8,255,391 B2 * | 8/2012 | Kulkarni ....................... 707/723 |
| 8,386,728 B1 * | 2/2013 | Ionescu et al. ................. 711/158 |
| 2002/0026435 A1 * | 2/2002 | Wyss et al. ....................... 707/1 |
| 2003/0046098 A1 * | 3/2003 | Kim ................................... 705/1 |
| 2005/0010546 A1 * | 1/2005 | Nowotny et al. .................. 707/1 |
| 2007/0136256 A1 * | 6/2007 | Kapur et al. ...................... 707/3 |
| 2007/0255702 A1 * | 11/2007 | Orme ................................. 707/5 |
| 2008/0215416 A1 * | 9/2008 | Ismalon ............................ 707/5 |
| 2009/0276389 A1 * | 11/2009 | Constantine et al. ........... 706/52 |
| 2009/0327270 A1 * | 12/2009 | Teevan et al. ..................... 707/5 |
| 2010/0114863 A1 * | 5/2010 | Steelberg et al. ............. 707/709 |
| 2010/0125570 A1 * | 5/2010 | Chapelle et al. .............. 707/722 |

* cited by examiner

*Primary Examiner* — James Trujillo
*Assistant Examiner* — Thong Vu
(74) *Attorney, Agent, or Firm* — Moritt Hock & Hamroff LLP; Steven S. Rubin, Esq.

(57) ABSTRACT

A system and method for determining a rank of a URL for a search query. A processor is effective to receive a search query and a URL. The processor may send the search query to a search engine and receive at least a first and a second result set from the search engine. The processor may determine a rank of the URL for the search query based on the first and second result sets. The processor may determine a variability of the rank of the URL based on the first and second result sets and generate a report including the rank and the variability of the rank.

14 Claims, 4 Drawing Sheets

URL RANK VARIABILITY DETERMINATION

BACKGROUND OF THE INVENTION

1. Field of the Invention

This disclosure relates to a system and method for determining a variability in a rank of a uniform resource locator (URL) in a result set of a search engine.

2. Description of the Related Art

Referring to FIG. 1, the World Wide Web ("WWW") is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 uses a processor 38 to send a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function. This disclosure describes an improvement over these prior art technologies.

SUMMARY OF THE INVENTION

One embodiment of the invention is a method for determining a rank of a URL for a search query. The method comprises receiving a search query by a processor; receiving a URL by the processor; sending the search query to a search engine by the processor; and receiving at least a first and a second result set from the search engine by the processor. The method further comprises determining a rank of the URL for the search query based on the first and second result sets by the processor; determining a variability of the rank of the URL based on the first and second result sets by the processor; and generating a report including the rank and the variability of the rank by the processor.

Another embodiment of the invention is a system effective to determine a rank of a URL for a search query. The system comprises a memory; and a processor in communication with the memory. The processor is effective to receive a search query; receive a URL; send the search query to a search engine; and receive at least a first and a second result set from the search engine. The processor is effective to determine a rank of the URL for the search query based on the first and second result sets; determine a variability of the rank of the URL based on the first and second result sets; generate a report including the rank and the variability of the rank by the processor; and store the report in the memory.

Another embodiment of the invention is a display comprising an indication of a rank of a URL result for a search query by a search engine; and an indication of a variability of the rank of the URL result for the search query.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
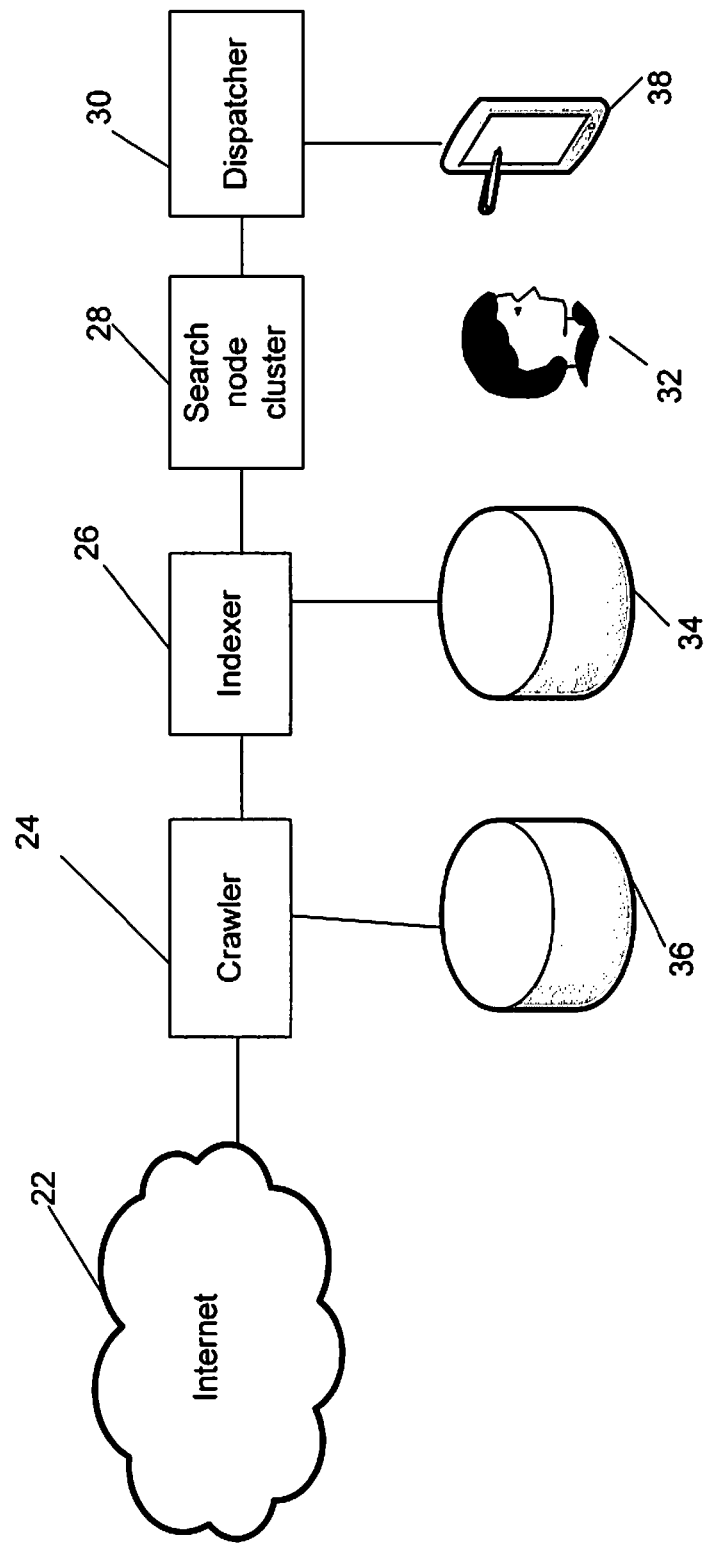
FIG. 1 is a system drawing of a search engine in accordance with the prior art.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
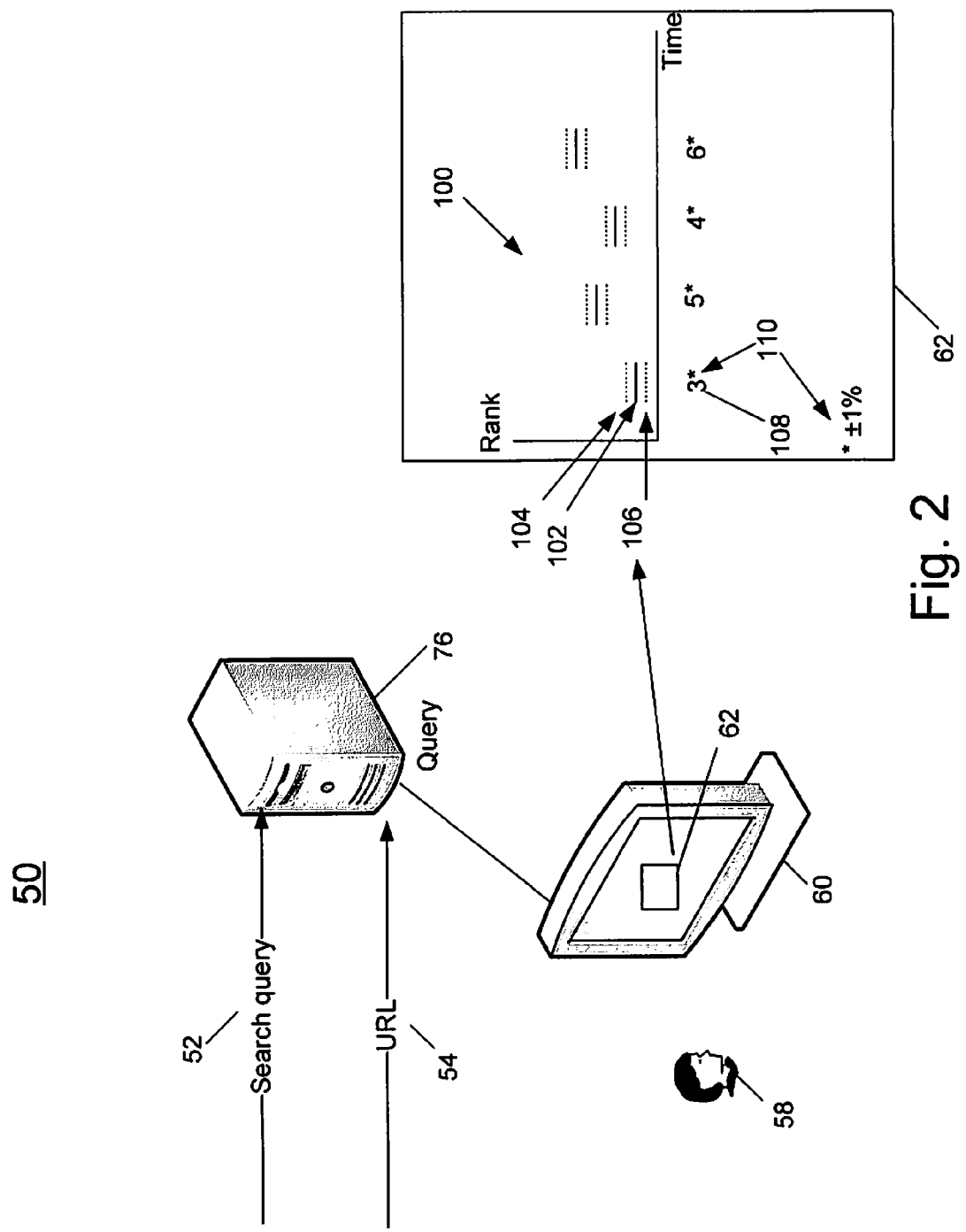
FIG. 2 is a system drawing of a system in accordance with an embodiment of the invention.

Referring to FIG. 2, there is shown a system 50 in accordance with an embodiment of the invention. As is described in more detail below, a user 58 may provide a search query 52 and a URL 54 to a query processor 76. Each search query 52 could be, for example, one or more characters, symbols, operators and/or words. Query processor 76 receives search query 52 and URL 54 and generates a report 62 indicating a rank of URL 54 in a result set generated by a search engine for search query 52. Report 62 may be displayed to user 58 on a display 60.

For example, as shown, report 62 may include a graph 100 showing a rank in a result set of a search engine of a URL for a search query. Graph 100 may show how the URL ranked in result sets for the search query over a period of time. For example, graph 100 may show a rank value 102 and variability bars 104, 106. Variability bars 104, 106 may indicate a variability in rank 102, as is explained in more detail below. Similarly, report 62 may include a rank 108 and a mark 110, such as an asterisk, indicating that rank 108 has a variability range. For example, mark 110 shown indicates thank rank 108 may have a potential variability percentage range of ±1%.

Figure 3:
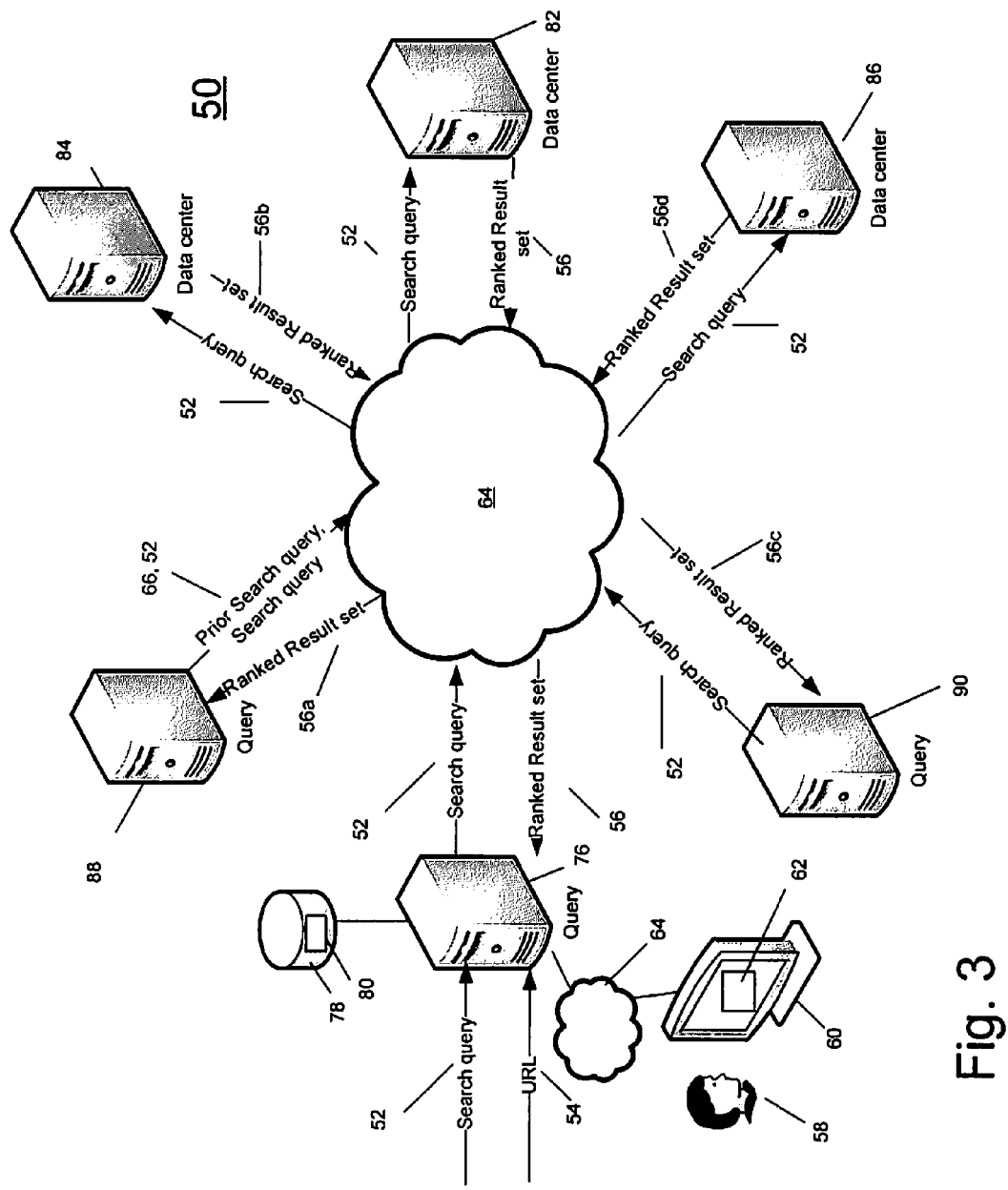
FIG. 3 is a system drawing of a system in accordance with an embodiment of the invention.
Figure 4:
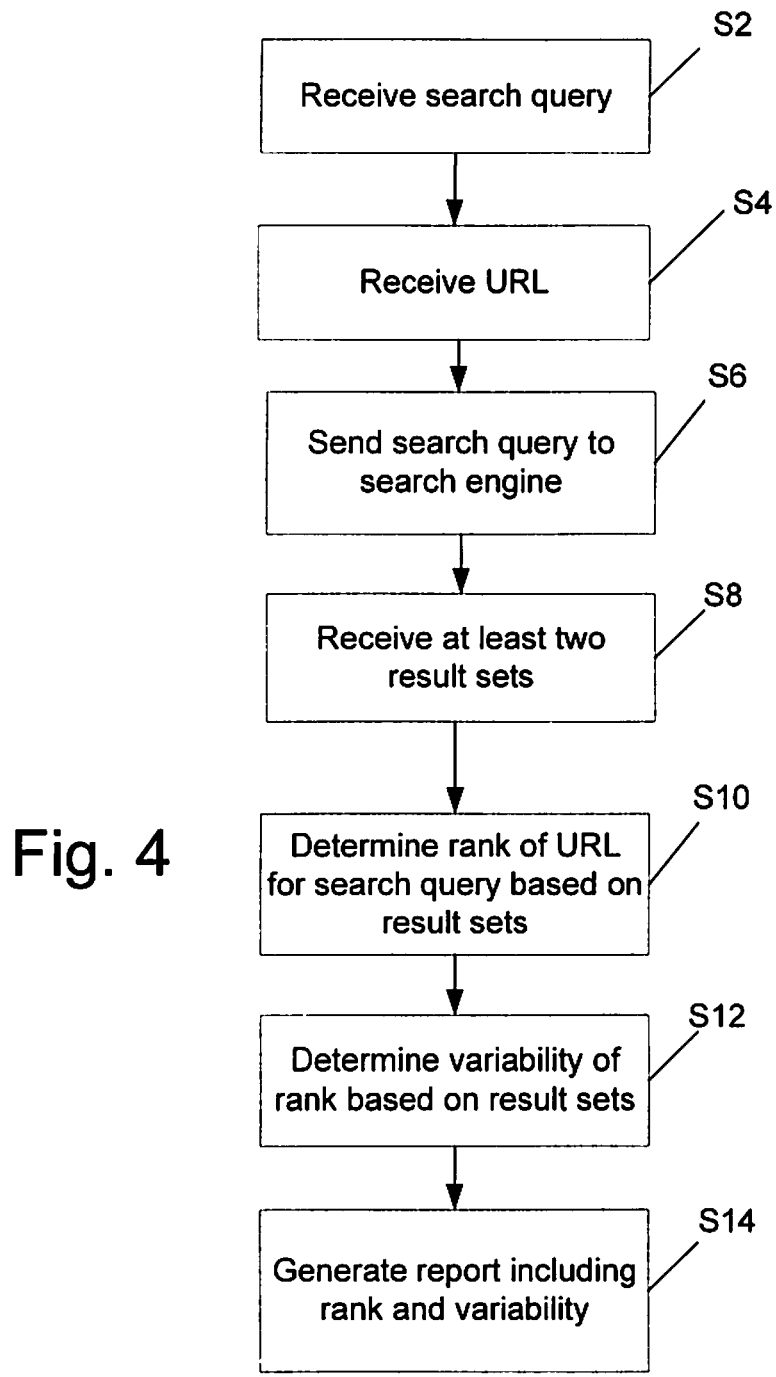
FIG. 4 is a flow chart illustrating a process which could be performed in a accordance with an embodiment of the invention.

Referring to FIG. 3, there is shown more detail of system 50. As shown, query processor 76 may be in communication with user 58 and display 60 over a network 64 such as the Internet network. Query processor 76 may further be in communication with a memory 78 including instructions 80 and with a data center 82 of a search engine over network 64.

Query processor 76 may receive search query 52 and URL 54 from user 58 or from another source. Search query 52 could include, for example, search queries relevant to a business and/or web site owned by user 58. URL 54 may include a URL relating to a web site owned by user 58 and/or a URL relating to a web site owned by competitors of user 58. Processor 76 may send each search query 52 over network 64 to data center 82 of a search engine. The search engine could be, for example, the GOOGLE search engine, the YAHOO! search engine, the BING search engine, etc. Data center 82 may receive search query 52 and search an index of the search engine for web pages and corresponding URLs that may include search query 52. Data center 82 may generate a result set listing web pages and URLs that include search queries 52. Data center 82 may then rank each of the URLs in the result set to produce a ranked result set 56 and send ranked result set 56 over internet 64 to query processor 76. Query processor 76 may receive ranked result set 56 and generate report 62 that may be stored in memory 78 and/or displayed on display 60. Ranked result set 56 could be used, for example, to generate rank 102 and/or rank 108 (FIG. 2). For example, ranked result set 56 may indicate that URL 54 is ranked number "3" in a result set produced by the search engine for search query 52.

The inventor(s) has/have determined that the rank in ranked result set 56 may have some level of variability. For example, a rank of a particular URL for a particular search query may change based on certain factors discussed in detail below. These sources of variability mean that rank 102, 108 may not provide a full analysis of the potential rank of a URL based on a search query.

For example, search engines frequently replicate indices among a plurality of geographically dispersed data centers. These data centers may be updated regularly but generally are not updated at the same time. This means that a query sent to one data center for a search query may produce a rank for a URL that is different from a rank produced by another data center for the same search query. This results in a source of variability for the rank of the URL for the search query. Other potential sources of variability in a rank for a URL may be based on a location of query processor 76 sending the queries. As many search engines alter ranked result sets based on a location of the processor sending the query, a search query including a search query originating from one location may produce a ranked result set that is distinct from a search query including the same search query originating from another location. For example, a query for the search query "zoo" may yield different ranked result sets if the query originated from a processor with an internet protocol (IP) address traced to New York than if the query originated from a processor with an IP address traced to California. Additionally, some search engines allow users to explicitly specify a location, and a rank of results returned by the search engine may be altered based on the location specified by the user.

Yet another source of variability may be produced from personalized search results. Some search engines allow a user to generate an account with the search engine. The account may be used to generate a history of search queries for a user. That history may be used by the search engine to alter ranks of URLs in result sets. For example, if a user has sent prior queries for the search query "animal", a query for the search query "python" may produce results for web pages about snakes ranked higher than results for web pages relating to the programming language python. Many search engines use the information from the history to alter an order of ranked search results. Even without affirmatively generating an account, some search engines store information about a particular user's search history in the user's browser. This storage is sometimes referred to as a cookie.

To provide a better analysis of a rank of URL 54 based for search query 52, system 50 may be able to determine a variability in rank 102, 108 of URL 54. For example, as mentioned above, query processor 76 may generate variability bars 104, 106 and/or mark 110 highlighting a variability in a rank of URL 54 based on search query 52.

For example, query processor 76 may send search query 52 to data center 82 and to other data centers 84 and 86. Data centers 84 and 86 receive search query 52 and produce ranked result sets 56*b* and 56*d* respectively. Query processor 56 may then receive ranked result sets 56, 56*b* and 56*d* from data centers 82, 84 and 86. Query processor 56 may determine rank 102, 108 of URL 54 for search query 52 from ranks of URL 54 in all received result sets—such as by an average or other statistical process. Query processor 76 may also generate variability bars 104, 106 and/or mark 110 illustrating the range of values for the rank of URL 54 for search query 52 in result sets 56, 56*b*, 56*c*. Query processor 76 may also generate a variability percentage range for rank 102, 108 based on a range of ranks in result sets 56, 56*b*, 56*c*. For example, mark 110 may indicate that the rank of a URL for search query 52 is rank 108 plus or minus a determined variability percentage range (e.g. a rank of 5±1%—see FIG. 2).

With respect to variability based on a location of a query processor, query processor 76 may send search queries 52 to another query processor 90 at a different location. For example, the query processors and/or browsers in the query processors may send geographic information and/or an internet protocol address relating to respective locations. For example, query processors may be placed at many locations throughout a geographic area. Both query processor 76 and query processor 90 may then send search queries 52 to data center 82 and receive ranked result sets 56 and 56*c* respectively. Query processor 76 and/or query processor 90 may compare differences in ranks of URL 54 for search query 52 in result sets 56 and 56*c* to determine rank 102, 108 and a variability range for the rank based on the difference. For example, an average rank may be determined of a URL 54 for a search query 52 and then a variability range from the average rank may be determined.

With respect to variability based on personalized search results, this type variability may change based on whether a potential user has an account with a search engine. To account for situations where the user does not have an account or where a user has an account but a web history option is not enabled, query processor 76 may analyze search query 52 and determine a probability that other search queries were searched prior to search query 52. For example, processor 76 may send a request to a web analytics service like COMSCORE to determine prior search queries that, statistically, may have been searched prior to search query 52. For example, if search query 52 is "telephone", a web analytics service may indicate that, statistically, 10% of the time, users search the search query "VERIZON" prior to the search query "telephone".

Query processor 76 may receive information regarding prior search queries that statistically may have been searched prior to search query 52. Query processor 76 may establish a dummy account, such as at query processor 88, to emulate a user. Query processor 88 may then send prior search queries 66 to data center 82 to generate the applicable cookie and/or search history at query processor 88. Query processor 88 may then send search query 52 to data center 82 and analyze ranked result set 56*a*. Similarly, query processor 76 may send search query 52 to data center 82 without first sending prior search queries 66. Query processor 76 and/or query processor 88 may then compare ranked result sets 56, 56a to determine rank 102, 108 and a variability of the rank of URL 54 for search query 52. In the example, ranked result set 56a for the search query "telephone" 52 with prior search query "VERIZON", may yield a higher rank for a URL relating to the VERIZON company than ranked result set 56 which was produced without the prior search query "VERIZON".

To account for variability in a rank of URLs for users who have an account with a search engine, query processor 88 may generate dummy accounts with a search engine and determine prior search queries 66 based on known profiles. For example, a web analytics service like COMSCORE, and/or a search engine like GOOGLE, may provide data regarding the types of search queries users of particular demographics typically generate. For example, such data may indicate the search queries typically generated by a middle aged man in the Western United States. Query processor 88 may send prior search queries 66 to data center 82. Query processor 88 may then send search query 52 to data center 82 and receive ranked result set 56a. Query processor 76 and/or query processor 88 may compare ranked result set 56a with ranked result set 56 provided to query processor 76 without a dummy account. Query processor 76 and/or query processor 88 may determine a variability in a rank of URL 54 for search query 52 based on ranked result sets 56 and 56a.

Similarly, query processor 88 may use the dummy account and establish a "friend" relationship with other users who have an account with the search engine. Query processor 88 may thereafter send search query 52 to data center 82. Query processor 88 and/or query processor 76 may then determine any differences between ranked result set 56 produced without the dummy account and ranked result set 56a. Such differences may indicate a variability due to personalization or a social graph such as when a "friend" account posts information in a weblog relating to a URL. Such a posting may affect a rank of a related URL in a result set.

Rank variability information may be determined by system 50 and then the variability information may thereafter be used. For example, once system 50 determines that data center variability typically contributes a variability level of ±x %, all URL ranks may then be marked with that variability. Similarly, if system 50 determines that localized results produce variability levels with ±y %, all localized results may be marked with that variability. For example, system 50 may analyze the search query and, based on features of the search query, determine that results for the search query likely will have a certain type of variability. Similarly, a results page may suggest a certain type of variability. For example, if the results page includes certain data types (e.g. maps, local, etc,) a certain type of variability is likely. System 50 may determine variability percentages periodically. Alternatively, system 50 may determine variability in rank of URLs for each search query 52 as it is received by query processor 76.

Among other benefits, system 50 may be able to determine a rank of a URL for a search query with more precise analysis than prior art systems. For example, system 50 can generate a report that indicates both an average rank for the URL and potential ranges of variability in that rank. Such information is more useful in web analytics because users will not always get the same rank of a URL for a search query. System 50 further can characterize regular variability in search engine results pages so that variability based on changes in a ranking algorithm can be distinguished from regular variability.

Referring to FIG. 5, there is shown a process which could be performed in accordance with an embodiment of the invention. The process could be performed using, for example, system 50 discussed above. As show, at a step S2, a processor may receive a search query. At step S4, the processor may receive a URL. At step S6, the processor may send the search query to a search engine. At step S8, the processor may receive at least two result sets for the search query as discussed above.

At step S10, the processor may determine a rank of the URL for the search query based on the result sets. At step S12, the processor may determine a variability of the rank based on the result sets. At step S14, the processor may generate a report for the URL including the rank and the variability.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a rank of a URL for a search query, the method comprising:
   receiving a search query by a processor;
   receiving a URL by the processor;
   sending the search query to a search engine by the processor;
   receiving a first result set from the search engine by the processor;
   receiving a second result set from the search engine by the processor;
   determining a first rank of the URL in the first result set;
   determining a second rank of the URL in the second result set;
   determining a third rank of the URL for the search query for the search engine based on the first and second result sets and the first and second ranks, by the processor;
   determining a variability of the third rank of the URL for the search engine based on the first and second result sets by the processor and the first and second ranks; and
   generating a report including the third rank and the variability of the third rank by the processor.

2. The method as recited in claim 1, further comprising:
   sending the search query to a first data center of the search engine by the processor;
   sending the search query to a second data center of the search engine by the processor;
   receiving the first result set from the first data center by the processor; and
   receiving the second result set from the second data center by the processor.

3. The method as recited in claim 1, wherein:
   the processor is a first processor, and the method further comprises:
   sending the search query to a second processor by the first processor;
   sending the search query to the data center by the second processor;
   receiving the second result set from the data center by the second processor;
   determining the first rank of the URL in the first result set for the search query by the first processor; and
   determining the second rank of the URL in the second result set for the search query by the second processor.

4. The method as recited in claim 3, wherein the first and second processors are at distinct locations.

5. The method as recited in claim 3, further comprising, prior to sending the search query to the data center by the second processor, generating an account by the second processor with the search engine.

6. The method as recited in claim 3, further comprising:
determining a prior search query by the second processor; and
prior to sending the search query by the second processor to the data center, sending the prior search query by the second processor to the data center.

7. The method as recited in claim 3, further comprising:
determining prior search queries relating to at least one demographic by the second processor; and
prior to sending the search query by the second processor to the data center, sending the prior search queries by the second processor to the data center.

8. A system effective to determine a rank of a URL for a search query, the system comprising:
a memory;
a processor in communication with the memory;
wherein the processor is effective to
receive a search query;
receive a URL;
send the search query to a search engine;
receive a first result set from the search engine;
determine a first rank of the URL in the first result set;
receive a second result set from the search engine;
determine a second rank of the URL in the second result set;
determine a third rank of the URL for the search query for the search engine based on the first and second result sets and the first and second ranks;
determine a variability of the third rank of the URL for the search engine based on the first and second result sets and the first and second ranks;
generate a report including the third rank and the variability of the third rank by the processor; and
store the report in the memory.

9. The system as recited in claim 8, wherein the processor is further effective to:
send the search query to a first data center of the search engine;
send the search query to a second data center of the search engine;
receive the first result set from the first data center; and
receive the second result set from the second data center.

10. The system as recited in claim 8, wherein:
the processor is a first processor, the system further comprises a second processor in communication with the first processor, and wherein:
the first processor is effective to
send the search query to the data center;
send the search query to the second processor;
determine a first rank of the URL in the first result set for the search query;
the second processor is effective to
receive the search query from the first processor;
send the search query to the data center;
receive the second result set from the data center;
determine a second rank of the URL in the second result set for the search query; and
one of the first and second processors are effective to determine the third rank and the variability of the third rank based on the first and second rank.

11. The system as recited in claim 10, wherein the first and second processors are at distinct locations.

12. The system as recited in claim 10, wherein the second processor is effective to, prior to being effective to send the search query to the data center, generate an account with the search engine.

13. The system as recited in claim 10, wherein the second processor is further effective to:
determine a prior search query; and
prior to being effective to send the search query to the data center, send the prior search query to the data center.

14. The system as recited in claim 10, wherein the second processor is further effective to:
determine prior search queries relating to at least one demographic; and
prior to being effective to send the search query to the data center, send the prior search queries to the data center.

* * * * *